United States Patent
Lee

(10) Patent No.: US 9,077,881 B2
(45) Date of Patent: Jul. 7, 2015

(54) CAMERA MODULE

(71) Applicant: SAMSUNG ELECTRO-MECHANICS CO., LTD., Suwon-si, Gyeonggi-do (KR)

(72) Inventor: Jae Hoon Lee, Yongin-si (KR)

(73) Assignee: Samsung Electro-Mechanics Co., Ltd., Suwon-Si, Gyeonggi-Do (KR)

( * ) Notice: Subject to any disclaimer, the term of this patent is extended or adjusted under 35 U.S.C. 154(b) by 42 days.

(21) Appl. No.: 13/692,704

(22) Filed: Dec. 3, 2012

(65) Prior Publication Data
US 2013/0162894 A1     Jun. 27, 2013

(30) Foreign Application Priority Data
Dec. 1, 2011    (KR) .................. 10-2011-0127739

(51) Int. Cl.
*H04N 5/225*     (2006.01)
*G03B 3/04*      (2006.01)
*G02B 21/36*     (2006.01)

(52) U.S. Cl.
CPC ........... *H04N 5/2257* (2013.01); *H04N 5/225* (2013.01); *H04N 5/2253* (2013.01); *G03B 3/04* (2013.01); *G02B 21/362* (2013.01)

(58) Field of Classification Search
CPC ........... H04N 5/2251–5/2254; H04N 5/2257; H04N 17/00; G03B 3/04; G03B 23/2484; G02B 21/362
USPC .................. 348/180, 187, 189, 190, 373, 374
See application file for complete search history.

(56) References Cited

U.S. PATENT DOCUMENTS

| | | | |
|---|---|---|---|
| 6,362,921 B1* | 3/2002 | Iida et al. | 359/627 |
| 7,489,340 B2* | 2/2009 | Koo et al. | 348/208.7 |
| 7,619,680 B1* | 11/2009 | Bingle et al. | 348/361 |
| 7,702,233 B2* | 4/2010 | Oh et al. | 396/133 |
| 2008/0192124 A1* | 8/2008 | Nagasaki | 348/208.11 |
| 2010/0176281 A1* | 7/2010 | Tomioka et al. | 250/227.2 |
| 2011/0050989 A1* | 3/2011 | Kim et al. | 348/374 |

FOREIGN PATENT DOCUMENTS

KR    10-2009-0047307 A    5/2009

* cited by examiner

*Primary Examiner* — Sinh Tran
*Assistant Examiner* — Mark Monk
(74) *Attorney, Agent, or Firm* — McDermott Will & Emery LLP

(57) ABSTRACT

Disclosed herein is a camera module herein. The camera module includes a case; a bracket that is installed in the case, wherein an elastic element is interposed between the bracket and the case, and the bracket is elastically supported in the case by the elastic element; a substrate coupled to a lower portion of the bracket; an image sensor installed on the printed circuit board, wherein an upper portion of the image sensor is inserted into the bracket; and a focusing and tilt adjuster that is coupled through a bottom surface of the case, wherein a front end portion of the focusing and tilt adjuster contacts the substrate.

11 Claims, 4 Drawing Sheets

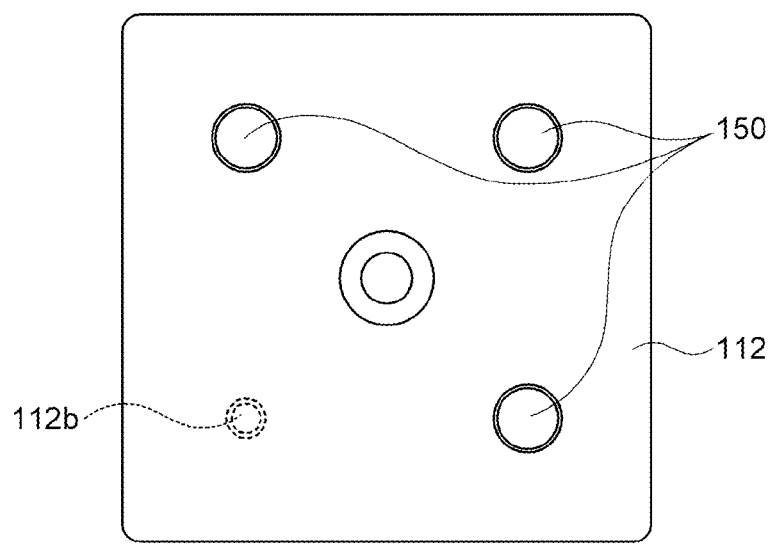

CAMERA MODULE

CROSS REFERENCE(S) TO RELATED APPLICATIONS

This application claims the benefit under 35 U.S.C. Section 119 of Korean Patent Application Serial No. 10-2011-0127739, entitled "Camera Module" filed on Dec. 1, 2011, which is hereby incorporated by reference in its entirety into this application.

BACKGROUND OF THE INVENTION

1. Technical Field

The present invention relates to a camera module, and more particularly, to a camera module in which focusing and a tilt are independently adjusted by adjusting bolts after the camera module is completely assembled, thereby preventing impurities from penetrating into the camera module and reducing an assembly time.

2. Description of the Related Art

In general, a compact camera module (CCM) has a small size. A CCM has been widely used in various information technology (IT) devices such as portable telecommunication devices (e.g., camera phones, personal digital assistants (PDAs), and smart phones) and toy cameras, and industrial devices such as vehicles and closed circuit televisions (CCTVs). Recently, a device containing a small-sized camera module has been increasingly introduced in order to satisfy various consumers' needs.

A camera module is manufactured by using, as a main component, an image sensor such as a charge coupled device (CCD), a complementary metal-oxide semiconductor (CMOS), or the like. The image sensor concentrates light and stores an image of a subject as data in a memory included in a device. The stored data is displayed as an image on a display medium included in the device, such as a liquid crystal display (LCD) device, a personal computer (PC) monitor, or the like.

A general camera module is completely assembled by installing a housing and a lens barrel on a substrate on which an image sensor is mounted. When the housing and the lens barrel are coupled to each other, a focus of the camera module is adjusted by adjusting intervals between lenses included in the lens barrel and the image sensor.

When a camera module is assembled, a position of the image sensor may be distorted with respect to an optical axis of a lens. When the camera module is completely assembled, whether a tilt of the image sensor occurs is tested. In this case, a camera module in which a tilt of an image sensor occurs is determined as a defective product and is discarded or is corrected so that a tilt of the image sensor may be adjusted.

Thus, with regard to a conventional cameral module, after the cameral module is assembled, whether failure occurs in the camera module is determined through a focusing and tilt test using a separate device. The camera module in which failure occurs needs to be discarded, thereby reducing a yield of the camera module.

In addition, after a camera module that is completely assembled is disassembled, focusing and a tilt may be adjusted by using improved manufacturing processes. However, the manufacturing processes are complicated and a time taken to perform processes again is increased, thereby reducing productivity.

RELATED ART DOCUMENTS

Patent Document (Patent Document 1) Korean Patent Laid-Open Publication No. 2009-47307

SUMMARY OF THE INVENTION

An object of the present invention is to provide a camera module in which focusing and a tilt are independently adjusted by bolts that are coupled outside a housing after the camera module is completely assembled, in order to overcome problems related to a conventional camera module.

Another object of the present invention is to provide a camera module in which focusing and a tilt are independently adjusted by using dual brackets installed in the camera module.

According to an exemplary embodiment of the present invention, there is provided a camera module, including a case; a bracket that is installed in the case, wherein an elastic element is interposed between the bracket and the case, and the bracket is elastically supported in the case by the elastic element; a substrate coupled to a lower portion of the bracket; an image sensor installed on the printed circuit board, wherein an upper portion of the image sensor is inserted into the bracket; and a focusing and tilt adjuster that is coupled through a bottom surface of the case, wherein a front end portion of the focusing and tilt adjuster contacts the substrate.

In this case, the camera module may further include an elastic member installed between the bottom surface of the case and a lower surface of the substrate and having a repulsive force with respect to an external force of the focusing and tilt adjuster.

The case may include an upper case and a lower case and may be assembled by interposing an adhesive agent between the upper case and the lower case. In addition, the upper case may include an opening portion formed therein, wherein a lens group may be coupled to the upper case and a cover glass may be installed on an upper end portion of the upper case so as to prevent the lens group from being exposed to an outside.

At least one focusing and tilt adjuster may be coupled through a lower portion of at least one corner portion of the lower case. In addition, the focusing and tilt adjuster may include a bolt that is screw-coupled to the lower case.

The bracket may include an upper bracket and a lower bracket, transparent glasses may be installed on central portions of the upper bracket and the lower bracket, respectively, and an infrared (IR) filter may be coated on a surface of any one of the transparent glasses installed on the central portions of the upper bracket and the lower bracket.

The bracket may be configured so that an upper portion of the lower bracket is inserted into a recess portion formed in the upper bracket. In addition, an internal lateral surface of the recess portion of the upper bracket and an upper end portion of the lower bracket may be formed as spherical surfaces so that the upper bracket and the lower bracket spherical-contact each other.

Protrusions may protrude from corner portions of a top surface of the upper bracket, respectively, and springs may be respectively interposed between the protrusions and the case, and front end portions of the springs are respectively inserted into grooves formed in the upper case so that the upper bracket is elastically supported in the case.

The image sensor installed on the upper surface of the printed circuit board is inserted into the lower bracket. In addition, a light receiving region of the image sensor is exposed through the transparent glasses installed on the upper bracket and the lower bracket and may receive light that is incident through the lens group installed in the upper case.

A lower surface of the substrate may contact a front end portion of the focusing and tilt adjuster coupled through the lower case, and a position of the image sensor may be adjusted in the case by adjusting a length of an exposed of the focusing and tilt adjuster, thereby independently adjusting focusing and a tilt.

BRIEF DESCRIPTION OF THE DRAWINGS

FIG. 4 is a bottom view of a camera module according to an embodiment of the present invention.

DESCRIPTION OF THE PREFERRED EMBODIMENTS

Hereinafter, the technological configuration, operation, and effect of a camera module will be described with regard to exemplary embodiments of the invention with reference to the attached drawings so that they can be easily practiced by those skilled in the art to which the present invention pertains.

Figure 1:
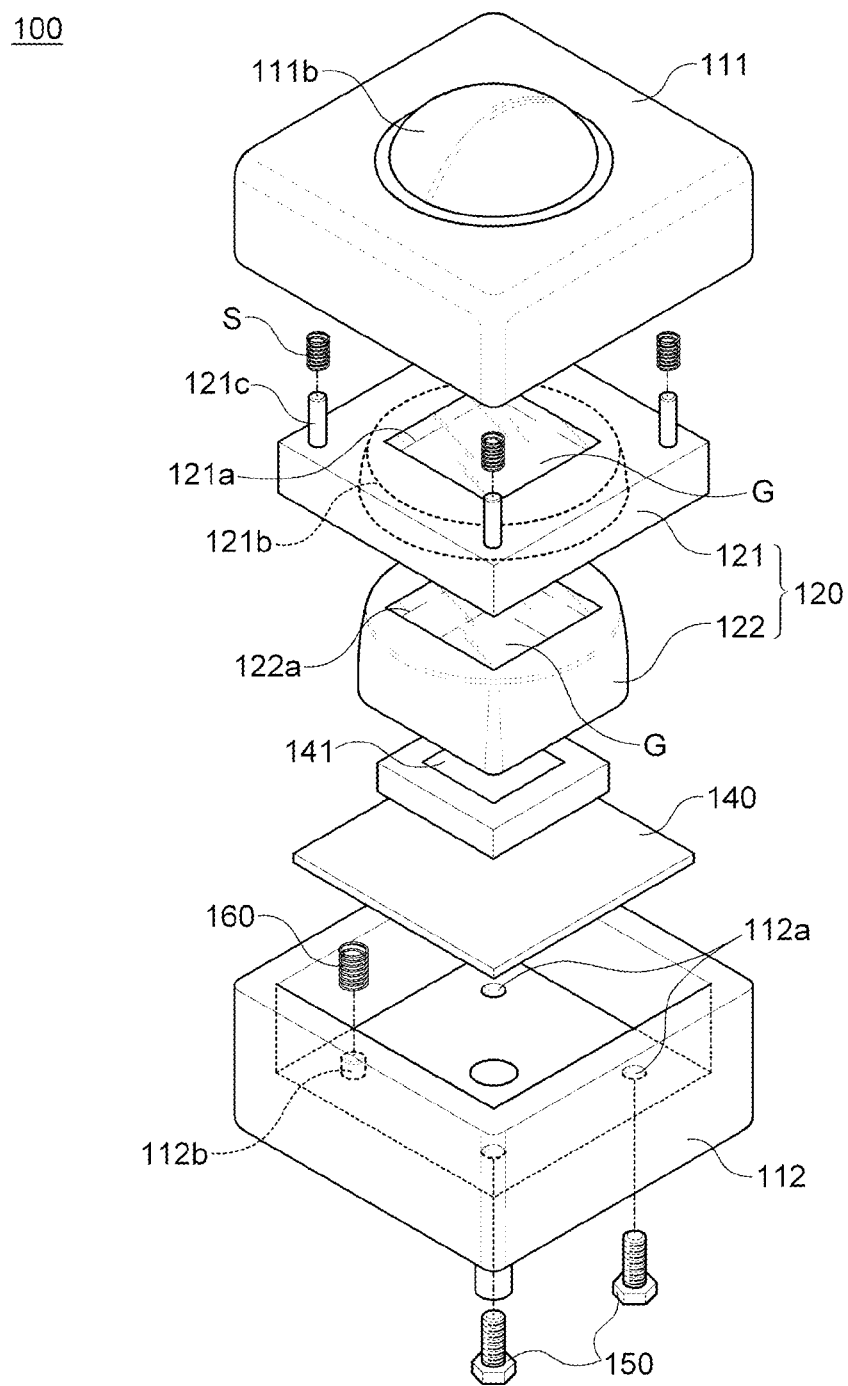
FIG. 1 is an assembled perspective view of a camera module according to an embodiment of the present invention.
Figure 2:
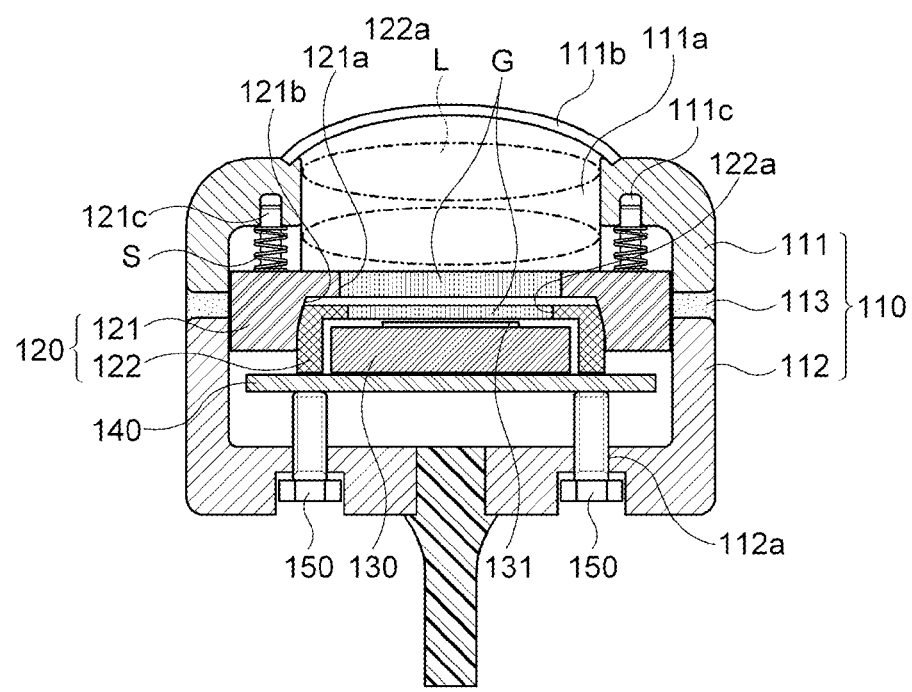
FIG. 2 is a cross-sectional view of a camera module viewed in one direction, according to an embodiment of the present invention.
Figure 3:
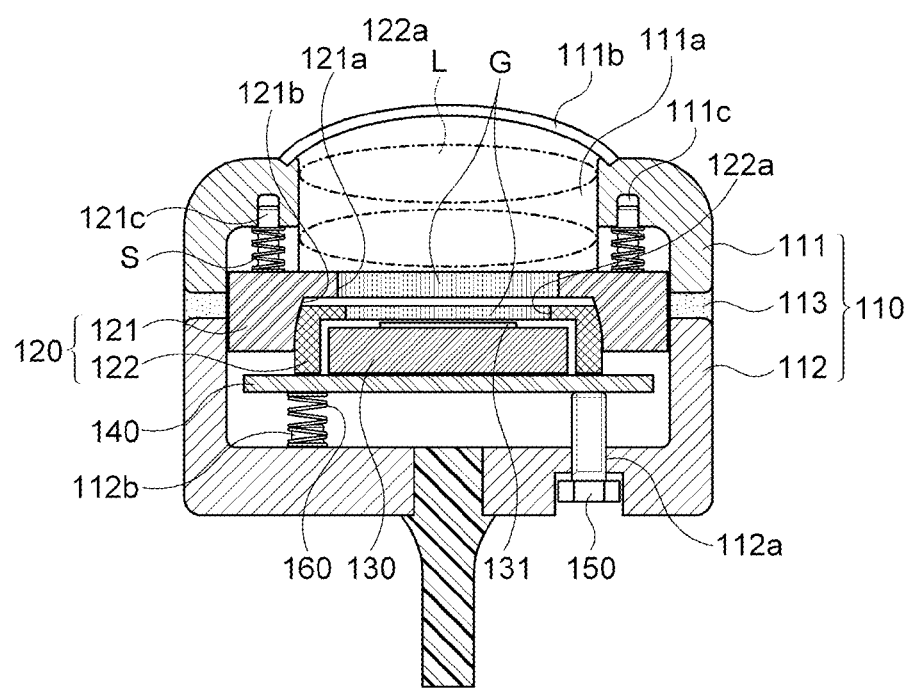
FIG. 3 is a cross-sectional view of a camera module viewed in another direction, according to an embodiment of the present invention.

FIG. 1 is an assembled perspective view of a camera module 100 according to an embodiment of the present invention. FIG. 2 is a cross-sectional view of the camera module 100 of FIG. 1 viewed in one direction, according to an embodiment of the present invention. FIG. 3 is a cross-sectional view of the camera module 100 of FIG. 1 viewed in another direction, according to an embodiment of the present invention. FIG. 4 is a bottom view of the camera module 100 according to an embodiment of the present invention.

As shown in FIGS. 1 through 4, the camera module 100 may include a case 110, a bracket 120 installed in the case 110, a substrate 140 installed below the bracket 120 and including an image sensor 130 installed on a central portion thereof, and focusing and tilt adjusters 150 that are installed through the case 110 so that front end portions of the focusing and tilt adjusters 150 may contact the substrate 140.

In this case, the camera module 100 may further include an elastic member 160 that is positioned adjacent to the focusing and tilt adjusters 150 installed in the case 110 and exerts a repulsive force to the substrate 140 whose position is adjusted by the focusing and tilt adjusters 150.

The case 110 may include an upper case 111 and a lower case 112 and may be configured as a box-type case by interposing an adhesive agent 113 between the upper case 111 and the lower case 112 and coupling the upper case 111 and the lower case 112 to each other to be integrated together.

The upper case 111 may include an opening portion 111a in which a lens group L is installed. A cover glass 111b is coupled to an upper portion of the opening portion 111a so as to seal the case 110.

In addition, at least one focusing and tilt adjuster 150 may be coupled to the lower case 112, which is coupled to the upper case 111 by the adhesive agent 113, through a bottom surface of the lower case 112. The focusing and tilt adjusters 150 may include bolts that are screw-coupled to the lower case 112 through holes 112a formed in a bottom surface of the lower case 112. Three holes 112a may be respectively formed in three corners except for one corner from among four corners of the bottom surface of the lower case 112. In addition, three focusing and tilt adjusters 150 may be coupled to the lower case 112 through the holes 112a, respectively.

The elastic member 160 may be installed on the bottom surface of the lower case 112, may be coupled to a protrusion 112b protruding from the corner in which any hole is not formed, and may be a compression spring, a rubber member, or the like that exerts an elastic force upward.

According to embodiments of the present invention, it is very important that a tilt and focusing may be adjusted by adjusting a position of the image sensor 130 coupled inside the case 110 by using operations of the elastic member 160 and the focusing and tilt adjusters 150 coupled to the lower case 112. Thus, driving structures of the focusing and tilt adjusters 150 and the elastic member 160 will be described below in more detail.

The bracket 120 may be installed inside the case 110. The bracket 120 may include an upper bracket 121 and a lower bracket 122. Through holes 121a and 122a may be formed in central portions of the upper bracket 121 and the lower bracket 122, respectively. Transparent glasses G may be respectively installed in the through holes 121a and 122a of the upper bracket 121 and the lower bracket 122.

The upper bracket 121 may include a recess portion 121b that is formed outside the through hole 121a. An internal lateral surface of the recess portion 121b may be formed as a curve surface. Thus, an upper portion of the lower bracket 122 may be inserted into the recess portion 121b so that an upper main surface of the lower bracket 122 may be closely attached to the internal lateral surface of the recess portion 121b. In addition, an upper end portion of the lower bracket 122 may also be formed as a curve surface so as to spherical-contact the recess portion 121b of the upper bracket 121.

Contact surfaces between the upper bracket 121 and the lower bracket 122 may correspond to spherical surfaces. Thus, a position of the upper end portion of the lower bracket 122 may be adjusted in X-axis, Y-axis, and Z-axis directions within the recess portion 121b of the upper bracket 121.

In this case, adjustment of the position of the lower bracket 122 in the X-axis, Y-axis, and Z-axis directions with respect to an operational configuration of the focusing and tilt adjusters 150 will be described below in detail.

A plurality of protrusions 121c may be formed on a top surface of the upper bracket 121. The protrusions 121c may respectively protrude from four corners of the upper bracket 121. Elastic elements S are respectively interposed between the protrusions 121 c and the upper bracket 121, and front end portions of the protrusions 121c are inserted into grooves 111c formed in the upper case 111 so that the upper bracket is elastically supported in the case 110.

The upper end portion having a spherical surface of the lower bracket 122 may be inserted into the recess portion 121b. A lower end portion of the lower bracket 122 may be installed on an upper surface of the substrate 140.

In this case, an infrared (IR) filter may be installed on any one of the transparent glasses G from among the transparent glasses G that are respectively installed in the through holes 121a and 122a of the upper case 111 and the lower case 112 so as to shield an excessive amount of IR contained in light transmitted through the lens group L installed in the upper case 111.

The lower end portion of the lower bracket 122 may be supported by an edge portion of the upper surface of the substrate 140. The image sensor 130 including a light receiving portion 131 may be installed on the central portion of the upper surface of the substrate 140. The image sensor 130 may be installed on the substrate 140 by using a wire bonding method or a flip-chip bonding method so as to be electrically connected to the substrate 140. In addition, the image sensor 130 may be coupled inside the lower bracket 122 while being installed on the substrate 140.

The image sensor 130 may receive light that is transmitted through the lens group L installed in the upper case 111 and the transparent glasses G respectively coupled to the upper bracket 121 and the lower bracket 122 and may convert the light into an electrical signal that may be output to an image. The up and down motion and a tilt of the image sensor 130 may be adjusted by adjusting a position of the substrate 140 within a range in which the lower bracket 122 whose upper end portion spherical-contacts the recess portion 121b on the upper surface of the substrate 140 is moveable.

In this case, the substrate 140 may include a printed circuit board (PCB) and a ceramic substrate.

The focusing and tilt adjusters 150 coupled through the lower case 112 and an upper end portion of the elastic member 160 coupled to the protrusion 112b protruding in the lower case 112 may contact a lower surface of the substrate 140. The position of the substrate 140 may be adjusted according to a tightening degree of the focusing and tilt adjusters 150 that contact the lower surface of the substrate 140.

Hereinafter, as described above, operational structures of the focusing and tilt adjusters 150 for adjusting the position of the substrate 140 and the focus and tilt adjustment between the image sensor 130 and the lens group L by using the operational structures will be described in detail.

With regard to the bracket 120 installed in the upper and lower cases 111 and 112, the upper bracket 121 is elastically supported against the upper case 111 by the elastic elements S and the lower bracket 122 is supported against the upper surface of the substrate 140. In addition, the four corner portions of the substrate 140 are supported by the elastic member 160 and the focusing and tilt adjusters 150 coupled through the lower case 112.

Contact surfaces of the upper bracket 121 and the lower bracket 122 correspond to spherical contact surfaces. Thus, the upper bracket 121 and the lower bracket 122 may be coupled to each other so that the upper end portion of the lower bracket 122 may be independently moved in an X-axis or Y-axis direction within the recess portion 121b of the upper bracket 121.

In this case, when the focusing and tilt adjusters 150 coupled through the lower case 112 are simultaneously or sequentially adjusted so as to contact the lower surface of the substrate 140, the substrate 140, the upper bracket 121, and the lower bracket 122, which are supported by the focusing and tilt adjusters 150, may be elastically moved upward and downward.

That is, by rotating all three bolts constituting the focusing and tilt adjusters 150 in one direction or an opposite direction thereto, the length of an exposed portion of each bolt may be adjusted. Thus, the bracket 120 including the upper bracket 121 and the lower bracket 122 supported against the substrate 140 and the image sensor 130 installed on the substrate 140 may be elastically moved so as to adjust a total height of the camera module 100. In addition, a level of the image sensor 130 installed on the substrate 140 may be adjusted so as to adjust an interval between the image sensor 130 and the lens group L, thereby adjusting focusing of the image sensor 130.

In this case, the bracket 120 may be elastically moved by the elastic element S installed on the top surface of the upper bracket 121. When the three bolts are adjusted, the substrate 140 may be elastically moved and is maintained in a horizontal state by elasticity of the elastic member 160. That is, the position of the substrate 140 on which the image sensor 130 is installed may be adjusted in the Z-axis direction (that is, an optical axis direction) by simultaneously or sequentially adjusting the lengths of the exposed portions of the focusing and tilt adjusters 150 including the three bolts.

Then, when at least one of the focusing and tilt adjusters 150 coupled through the lower case 112 is adjusted so as to contact the lower surface of the substrate 140, one side of the substrate 140 supported by the focusing and tilt adjusters 150 and a corresponding side of the lower bracket 122 may be moved upward and downward.

That is, when at least one or two of the three bolts constituting the focusing and tilt adjusters 150 are rotated in one direction or an opposite direction thereto, the length of the exposed portion of at least one bolt from among the three bolts that contact the lower surface of the substrate 140 may be adjusted. Thus, inclination of the substrate 140 and the lower bracket 122 supported against the substrate 140 is adjusted, thereby adjusting a tilt of the image sensor 130 installed on the substrate 140.

As such, the substrate 140 and the lower bracket 122 may be independently moved from the upper bracket 121 so as to adjust the inclination of the image sensor 130 with respect to an optical axis, that is, a tilt of the image sensor 130. The adjustment may be possible since the internal lateral surface of the recess portion 121b of the upper bracket 121 and the upper end portion of the lower bracket 122 spherical-contact to each other and are coupled to each other by using a hinge joint method.

In this case, the inclination of the lower bracket 122 and the substrate 140 may be adjusted by the elasticity of the elastic member 160 when at least one or two of the three bolts constituting the focusing and tilt adjusters 150 are adjusted. Thus, the lengths of the exposed portions of the focusing and tilt adjusters 150 may be adjusted, and accordingly the level of the image sensor 130 may be adjusted in the X-axis or Y-axis direction, thereby adjusting a tilt of the image sensor 130.

As described above, in a camera module according to the present invention, focusing and a tilt may be independently adjusted by bolts that are coupled outside a housing after the camera module is completely assembled, thereby increasing a yield and productivity of the camera module.

After the camera module is completely assembled, focusing and a tilt may be adjusted without disassembling the camera module, and thus impurities may be prevented from penetrating into a top surface of the image sensor, thereby remarkably reducing failure of the camera module.

When focusing and a tilt of the image sensor are adjusted, a lens group coupled to a case is never moved or movable, thereby increasing accuracy of adjustment of a tilt and focusing of the image sensor.

In addition, focusing and a tilt may be adjusted by simply adjusting the level and inclination of a substrate by using a focusing and tilt adjuster coupled to a lower portion of a case, thereby preventing a shift due to a horizontal movement of the substrate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A camera module, comprising:
   a case;
   a bracket that is installed in the case, wherein an elastic element is interposed between the bracket and the case, and the bracket is elastically supported in the case by the elastic element and the bracket includes an upper bracket and a lower bracket;
   a substrate coupled to a lower portion of the lower bracket;
   an image sensor installed on the substrate, wherein an upper portion of the image sensor is inserted into the lower bracket; and
   a focusing and tilt adjuster that is coupled through a bottom surface of the case, wherein a front end portion of the focusing and tilt adjuster contacts the substrate,
   wherein an internal lateral surface of a recess portion of the upper bracket and an upper end portion of the lower bracket are formed as spherical surfaces so that the upper bracket and the lower bracket spherical-contact each other.

2. The camera module according to claim 1, further comprising an elastic member installed between the bottom surface of the case and a lower surface of the substrate and having a repulsive force with respect to an external force of the focusing and tilt adjuster.

3. The camera module according to claim 1, wherein the case includes an upper case and a lower case and is assembled by interposing an adhesive agent between the upper case and the lower case.

4. The camera module according to claim 3, wherein the upper case includes an opening portion formed therein, wherein a lens group is coupled to the upper case and a cover glass is installed on an upper end portion of the upper case so as to prevent the lens group from being exposed to an outside.

5. The camera module according to claim 3, wherein at least one focusing and tilt adjuster is coupled through at least one corner portion of the lower case.

6. The camera module according to claim 5, wherein the focusing and tilt adjuster includes a bolt that is screw-coupled to the lower case.

7. The camera module according to claim 1,
   wherein transparent glasses are installed on central portions of the upper bracket and the lower bracket, respectively, and
   wherein an infrared (IR) filter is coated on a surface of any one of the transparent glasses installed on the central portions of the upper bracket and the lower bracket.

8. The camera module according to claim 7, wherein the bracket is configured so that an upper portion of the lower bracket is inserted into the recess portion formed in the upper bracket.

9. The camera module according to claim 7, wherein protrusions protrude from corner portions of a top surface of the upper bracket, respectively, and
   wherein elastic elements are respectively interposed between the protrusions and the case, and front end portions of the protrusions are respectively inserted into grooves formed in the upper case so that the upper bracket is elastically supported in the case.

10. The camera module according to claim 7, wherein the image sensor installed on the upper surface of the substrate is inserted into the lower bracket.

11. The camera module according to claim 1, wherein a lower surface of the substrate contacts a front end portion of the focusing and tilt adjuster coupled through the lower case, and
    wherein a position and inclination of the image sensor are adjusted in the case by adjusting a length of an exposed of the focusing and tilt adjuster.

* * * * *